United States Patent [19]

Ogura et al.

[11] Patent Number: 5,359,590
[45] Date of Patent: Oct. 25, 1994

[54] DISC DRIVE DEVICE HAVING NEGATIVE PRESSURE PAD

[75] Inventors: Shigeo Ogura; Shigeki Okauchi, both of Tokyo, Japan

[73] Assignee: Canon Kabushiki Kaisha, Tokyo, Japan

[21] Appl. No.: 176,332

[22] Filed: Jan. 3, 1994

Related U.S. Application Data

[63] Continuation of Ser. No. 780,725, Oct. 21, 1991, abandoned.

[30] Foreign Application Priority Data

Oct. 24, 1990 [JP] Japan .................................. 2-284383
Apr. 3, 1991 [JP] Japan .................................. 3-071053

[51] Int. Cl.$^5$ ............................................. G11B 15/60
[52] U.S. Cl. ............................................. 369/263; 360/102
[58] Field of Search ............................ 369/258, 263; 360/99.01, 102, 103

[56] References Cited

U.S. PATENT DOCUMENTS

| | | | |
|---|---|---|---|
| 4,578,727 | 3/1986 | Hills | 360/102 |
| 4,620,250 | 10/1986 | Hills | 360/102 |
| 4,998,175 | 3/1991 | Yoshimori et al. | 360/102 |
| 5,005,098 | 4/1991 | Kanada | 360/102 |
| 5,034,933 | 7/1991 | Fujisawa et al. | 360/114 |

*Primary Examiner*—Edward P. Westin
*Assistant Examiner*—Stephone B. Allen
*Attorney, Agent, or Firm*—Robin, Blecker, Daley & Driscoll

[57] ABSTRACT

A disc drive device which comprises a negative-pressure pad for generating a negative pressure between the negative-pressure pad and a disc-shaped recording medium by the rotation of the disc-shaped recording medium and a displacement member for bringing the negative-pressure pad and a surface of the disc-shaped recording medium close to each other at least once after the disc-shaped recording medium has started to rotate.

28 Claims, 12 Drawing Sheets

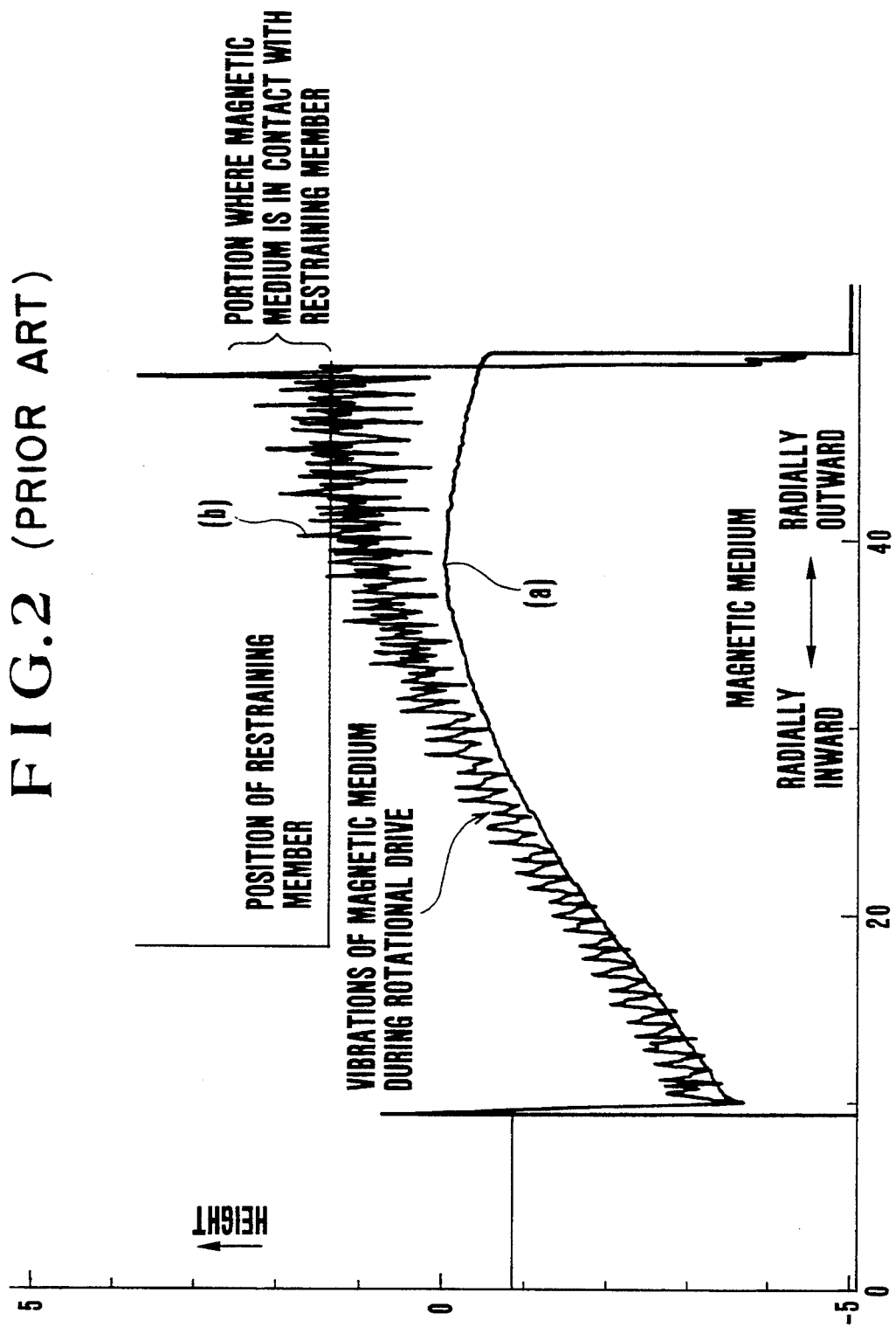

DISC DRIVE DEVICE HAVING NEGATIVE PRESSURE PAD

This is a continuation of prior application Ser. No. 780,725, filed Oct. 21, 1991, now abandoned.

BACKGROUND OF THE INVENTION

1. Field of the Invention

The present invention relates generally to a disc drive device and, more particularly, to a disc drive device for rotationally driving a disc-shaped recording medium such as a magnetic disc or an opto-magnetic disc.

2. Description of the Related Art

Magnetic discs are known as recording media for recording various kinds of information such as data, images or sound. For example, electronic still cameras utilize magnetic discs for image recording. In such an electronic still camera, a video signal outputted from an image sensor is recorded on a magnetic disc called a still video floppy disc. One field of video signal can be recorded on each track, and it is prescribed that, in the case of frame-image recording, odd and even fields of video signals are recorded on adjacent two tracks. A standard still video floppy disc is provided with fifty tracks and can record fifty field images or twenty-five frame images.

A typical mechanism for driving a still video floppy disc includes a spindle motor for causing the still video floppy disc to rotate and a head movement mechanism for causing a magnetic head to move radially with the floppy disc. The head movement mechanism includes a carriage for carrying the magnetic head, a stepping motor for generating a driving force for head movement, and a rotary motion-to-linear motion converting mechanism, such as a leadscrew or a cam, for converting the rotary motion of the stepping motor to the linear motion of the carriage. The movement distance of the magnetic head is determined by the number of pulses applied to the stepping motor, and it is prescribed that the magnetic head moves by one track (0.1 mm radially) by the application of, for example, four pulses. In other words, open-loop control is adopted which does not use electrical feedback.

Regarding control of head touch, in addition to a positive-pressure pad system for applying a positive pressure by using a pad, a negative-pressure pad system is known in which a negative-pressure type of pad is provided around a magnetic head and a negative pressure is generated between a floppy disc and the pad by the motion of air flow near the floppy disc which is rotating so that the contact between the magnetic head and the floppy disc is stabilized.

Recording timing for such a still video floppy disc is explained in brief. Signals are concentrically recorded with a 60-$\mu$m track width and on 100-$\mu$m track pitch, and recording on each track is started by making reference to a starting point, i.e., the center of a PG yoke provided on the still video floppy disc. A PG signal obtained by detecting the PG yoke is generated once for one rotation of the floppy disc, and the leading edge of a vertical synchronizing signal Vs appears when a 7H period (1H is one horizontal synchronizing period) passes after the detection of the PG signal. A vertical blanking period including the vertical synchronizing signal Vs is a period of approximately 20H which starts 3H before the vertical synchronizing signal Vs, and video signals for one field are recorded after the vertical blanking period.

However, the conventional negative-pressure pad has the problem that if a disc-shaped recording medium manufactured by a particular magnetic-disc maker curves in a direction away from the negative-pressure head or if a disc-shaped recording medium curves in such a direction owing to its deformation under high- or low-temperature conditions, no negative pressure is generated while the disc-shaped recording medium is rotating and no predetermined head touch is obtained between the disc-shaped recording medium and the magnetic head, with the result that no recording can be performed.

To cope with the above-described problem, an arrangement has been proposed in which an upper pad for suppressing the curvature of the disc-shaped recording medium is provided on the side of the disc-shaped recording medium that is opposite to the negative-pressure pad. However, this arrangement still has the following problems. The first problem is that the distance between the upper pad and the disc-shaped recording medium must be set with high precision and the second problem is that since the upper pad presses against the disc-shaped recording medium, the magnetic head and the disc-shaped recording medium easily wear severely to lower the durability of the disc drive device itself.

A disc drive device employing this kind of negative-pressure pad has the problem that if a disc-shaped recording medium and the negative-pressure pad are spaced apart from each other in excess of a distance within which the disc-shaped recording medium can be drawn to the negative-pressure pad by suction, the negative-pressure pad cannot draw the disc-shaped recording medium by suction even after the disc-shaped recording medium has started rotating. To solve this problem, such a disc drive device is provided with a restraining member for forcibly pressing the disc-shaped recording medium upon mounting thereof until the disc-shaped recording medium reaches the distance within which it can be drawn by suction to the negative-pressure pad. When the disc-shaped recording medium is drawn to the negative-pressure pad by suction, it is separated from the restraining member by the suction operation of the negative-pressure pad.

FIGS. 1(A) and 1(B) show one example of the disc drive device provided with the above-described restraining member.

FIG. 1(A) shows the state of a magnetic disc being unmounted and FIG. 1(B) shows the state of the magnetic disc being mounted. The shown example includes a chassis 101 of a recording or reproducing apparatus, a magnetic medium 102 on which information is to be recorded, a hard case 103 in which the magnetic medium 102 is accommodated, a spindle motor 104 for rotationally driving the magnetic medium 102 at a predetermined rotational speed, a restraining member 105 supported turnably at one end by a mounting portion 107 of the chassis 101 to restrain the rotational fluctuations of the magnetic medium 102, and an engagement portion 106 provided in the restraining member 105 for holding the restraining member 105 in the state shown in FIG. 1(A) by being maintained in contact with the hard case 103 when the magnetic disc is in an unmounted state.

The shown example also includes a head 108 for recording or reproducing information on or from the magnetic medium 102, and a pad 109. The pad 109 is fixed to the head 108 and has one surface provided with a groove. When the magnetic medium 102 is made to rotate, a negative pressure is generated by the groove to draw the magnetic medium 102 by suction.

In the recording or reproducing apparatus provided with the above-described arrangement, if the magnetic disc is in the unmounted state shown in FIG. 1(A), the restraining member 105 is kept away from the magnetic medium 102. If the magnetic disc is shifted to the mounted state of FIG. 1(B), the restraining member 105 is made to move to its restraining position in interlocked relation to this shift, whereby the rotational fluctuations or curvature of the magnetic medium 102 occurring during the rotation thereof is reduced by the restraining member 105 to cause the pad 109 to securely generate a negative pressure, thereby drawing the magnetic medium 102 to the pad 109 by suction. Thus, the magnetic medium 102 is maintained in stable head touch relative to the head 108.

However, such a recording or reproducing apparatus has a number of problems. For example, the restraining member is at all times located in the restraining position when the magnetic disc is in the mounted state, that is, the restraining member remains in the restraining position even after the pad has drawn the magnetic medium by suction. As a result, if the rotational fluctuations or the like of the magnetic medium occur during the rotation thereof, the magnet medium may come into contact with the restraining member.

FIG. 2 is a graph showing the positional relation between the magnetic medium and the restraining member. In FIG. 2, a waveform (a) indicates the waveform obtained when the magnetic medium is not being rotationally driven, and a waveform (b) indicates the waveform obtained when the magnetic medium is being rotationally driven.

As can be seen from the waveform (b), during the rotational drive of the magnetic medium, a phenomenon actually occurs in which the position of the restraining member partially coincides with the waveform of the rotational fluctuations of the magnetic medium and the restraining member and the magnetic medium are in partial contact with each other.

This phenomenon not only causes the rotational fluctuations of a rotating system but also leads to the problem that the magnetic medium is damaged during the long-time rotational drive thereof.

SUMMARY OF THE INVENTION

A first object of the present invention which has been made to solve the above-described problems is to provide a disc drive device capable of pressing a disc in stable and secure contact with a head at all times to realize good head touch.

A second object of the present invention is to provide a disc drive device provided with a negative-pressure pad capable of securely drawing a disc by suction to press it in contact with a head.

To achieve the above-described objects, according to one aspect of the present invention, there is provided a disc drive device which comprises a negative-pressure pad for generating a negative pressure between the negative-pressure pad and a disc-shaped recording medium by the rotation of the disc-shaped recording medium and displacement means for bringing the negative-pressure pad and a surface of the disc-shaped recording medium close to each other at least once after the disc-shaped recording medium has started to rotate.

In the above-described arrangement, since the negative-pressure pad is pressed against the disc-shaped recording medium during an initial period of the rotation thereof, it is possible to generate reliably a negative pressure between the disc-shaped recording medium and the negative-pressure pad without using an upper pad which generates a positive pressure pressing the recording medium to a head. Accordingly, good head touch can be realized.

A third object of the present invention is to provide a recording or reproducing apparatus provided with restraining means capable of drawing securely a magnetic medium to a pad by suction and preventing the magnetic medium from being damaged.

A fourth object of the present invention is to provide a disc drive device of excellent durability which is capable of causing restraining means for restraining the rotational fluctuations of a disc to move away therefrom after the disc has been securely drawn to the pad by suction, thereby preventing the problem that the disc is rotated irregularly or damaged by coming into contact with the restraining means due to the rotational fluctuations of the disc.

To achieve the above objects, according to another aspect of the present invention, there is provided a recording or reproducing apparatus which comprises a head for performing conversion of information when in contact with a flexible medium, a rotating mechanism for causing the medium to rotate at a predetermined rotational speed, a pad for drawing the medium to the head by suction while the medium is rotating, and controlling means movable between a first position for restraining the rotational fluctuations of the medium and a second position away from the medium, depending on the state of suction between the medium and the pad.

In this arrangement, since the restraining means for restraining the rotational fluctuations of a magnetic medium is moved away therefrom after the magnetic medium has been securely drawn to the pad by suction, the magnetic medium does not come into contact with the restraining means due to the rotational fluctuations of the magnetic medium occurring during the rotation thereof. Accordingly, it is possible to prevent occurrence of the irregular rotation of a rotating system and damage to the magnetic medium.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 2 is a graph showing the positional relation between a disc-shaped recording medium and a restraining member;

DETAILED DESCRIPTION OF THE PREFERRED EMBODIMENT

Preferred embodiments of a disc drive device according to the present invention will be described below in detail with reference to the accompanying drawings.

Figure 1A:
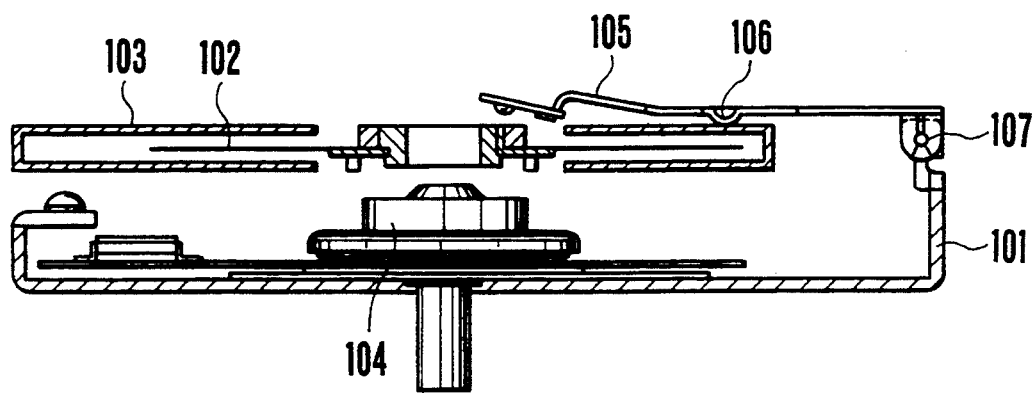
FIGS. 1(A) and 1(B) are cross-sectional side elevational views diagrammatically showing the construction of a disc drive device which is precedent to the present invention.
Figure 1B:
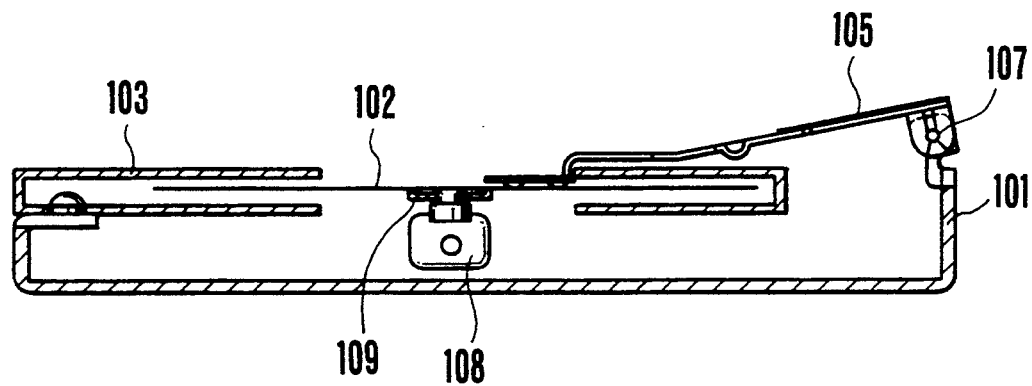
Figure 3:
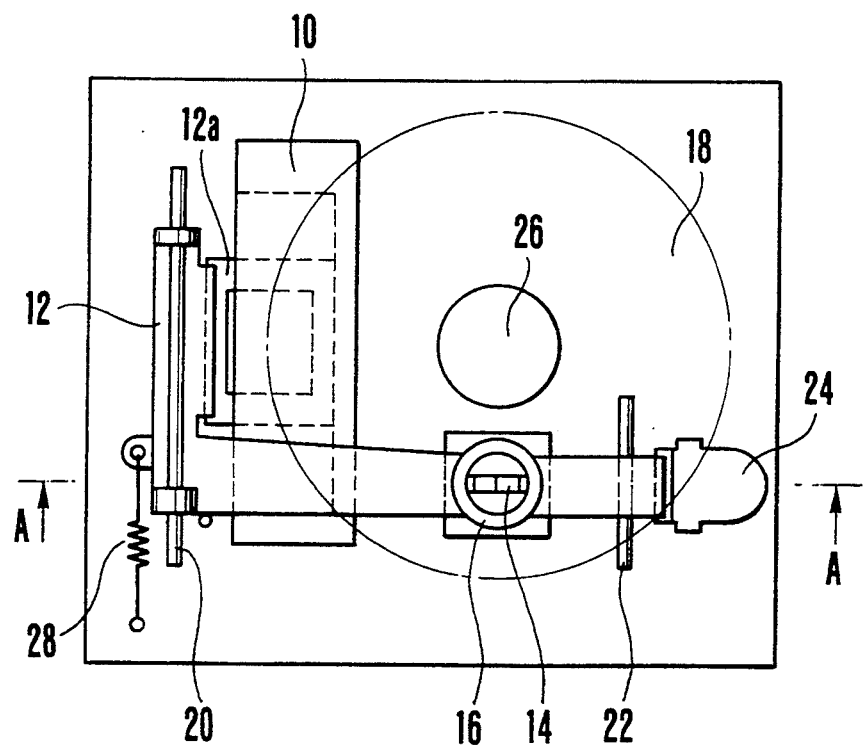
FIG. 3 is a schematic plan view showing a first embodiment of the present invention.
Figure 4:
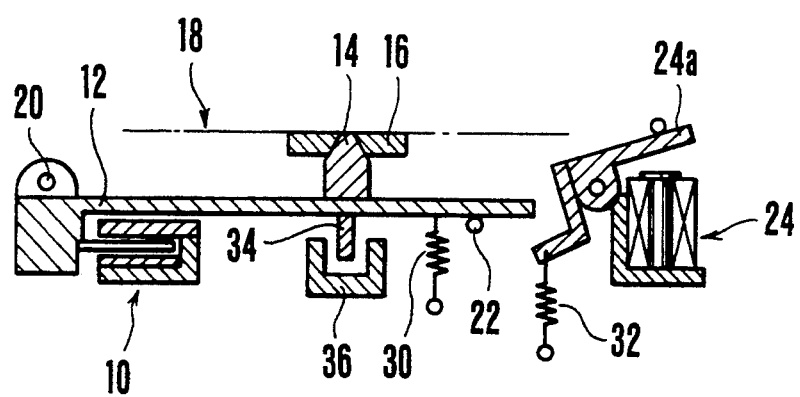
FIG. 4 is a cross-sectional view taken along line A—A of FIG. 3.

FIG. 3 is a schematic plan view showing a first embodiment of a disc drive device according to the present invention, and FIG. 4 is a cross-sectional view taken along line A—A of FIG. 1.

The disc drive device shown in FIG. 3 includes a linear motor 10, a carriage 12 for supporting and moving a field head 14, a negative-pressure pad 16 fixed to the field head 14 for generating a negative pressure to draw a still video floppy disc 18 by suction utilizing an air flow caused by the rotation of the still video floppy disc 18, guide shafts 20 and 22 for guiding the movement of the carriage 12 radially with the floppy disc 18, an electromagnet 24 for moving the carriage 12 and hence the head 14 up and down with respect to the floppy disc 18 in response to turning on and off of applied current, a spindle motor 26 for causing the floppy disc 18 to rotate, and a spring 28 for biasing the carriage 12 to a radially outward initial position.

Referring to FIG. 4, a spring 30 urges the carriage 12 in a direction away from the opposing surface of the floppy disc 18. A spring 32 urges an armature 24a of the electromagnet 24 counterclockwise as viewed in FIG. 4. A position detecting plate 34 is fixed to the carriage 12 and has a slit-like fringe pattern printed, for example, on 1 track pitch. A photointerrupter 36 consists of a light emitting element and a light receiving element. The position detecting plate 34 and the photointerrupter 36 constitute an optical encoder, and the position of the carriage 12 can be detected by this optical encoder. For example, a reversible counter is used to count the output of the light receiving element of the photointerrupter 36 while taking the phase of the output into account, and the linear motor 10 is driven so that the count of the reversible counter can reach a value corresponding to a desired track position.

Figure 5:
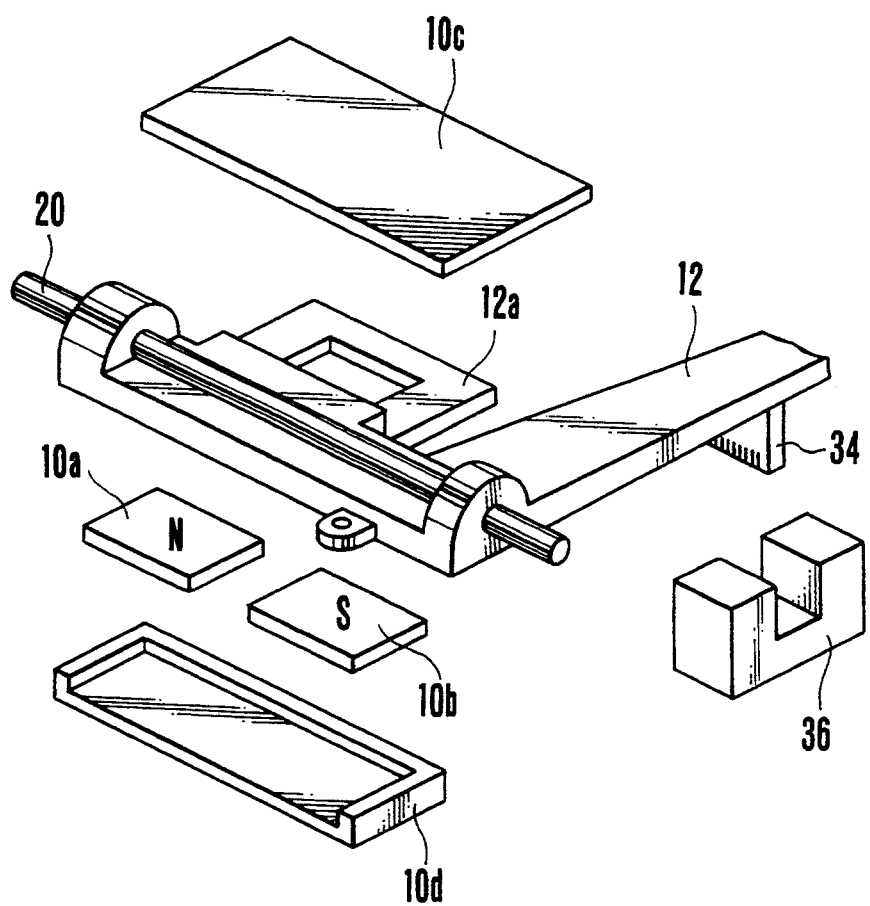
FIG. 5 is an exploded perspective view showing a linear motor 10 and parts associated therewith.

FIG. 5 is an exploded perspective view showing the linear motor 10 and peripheral parts thereof. Permanent magnets 10a and 10b are disposed so that they are of opposite polarity to each other, for example, in such a manner that the upper side of the permanent magnet 10a has an N-pole, while the upper side of the permanent magnet 10b has an S-pole. Yokes 10c and 10d form a magnetic path for the linear motor 10, and the magnets 10a and 10b are bonded to the yoke 10d. The magnets 10a and 10b bonded to the yoke 10d are covered by the yoke 10c. A coil 12a serves as a driving part for the linear motor 10, and is fixed to the carriage 12, by adhesion. The coil 12a is disposed in a position to traverse the magnetic path between the magnets 10a, 10b and the yoke 10c. When a current is made to flow in the coil 12a, the coil 12a, i.e., the carriage 12, travels along the length of the yoke 10c in accordance with Fleming's left-hand rule. Thus, the head 14 is made to move radially with the floppy disc 18.

The disposition of the linear motor 10 will be described in more detail with reference to FIG. 3. To reduce the thickness of the entire disc drive device, the medium surface of the floppy disc 18 and the linear motor 10 are flat in the same direction, and, in addition, to reduce the size of the entire disc drive device, the floppy disc 18 and the linear motor 10 are positioned in overlapped relation in the plan view. For further miniaturization, the linear motor 10 is disposed close to the spindle motor 26. The connection between the carriage 12 and the coil 12a is positioned on the side of the linear motor 10 that is opposite to the spindle motor 26, whereby the magnetism leakage part of the linear motor 10 can be made as remote as possible from the floppy disc 18 and the spindle motor 26.

The operation of the peripheral components of the negative-pressure pad 16 will be described with reference to FIG. 4. When the floppy disc 18 is driven by the spindle motor 26 and the rotational speed rises up to a predetermined value, the electromagnet 24 is energized to attract the armature 24a. The carriage 12 is made to turn up on the guide shaft 20 by the resultant force to bring the head 14 and the negative-pressure pad 16 into close proximity to or abutment with the medium surface of the floppy disc 18, so that a negative pressure is generated between the medium and the negative-pressure pad 16. Thus, good head touch is realized. Even if the electromagnet 24 is deenergized to return the carriage 12 to the original position, the negative-pressure pad 16 which has generated the negative pressure and drawn the medium by suction continues to draw the medium by suction, keeping good head touch, as long as the floppy disc 18 is rotating.

After the rotational speed of the floppy disc 18 has reached the predetermined value and reliable head touch has been obtained by the above-described operation, a video signal is recorded on the floppy disc 18.

Figure 6:
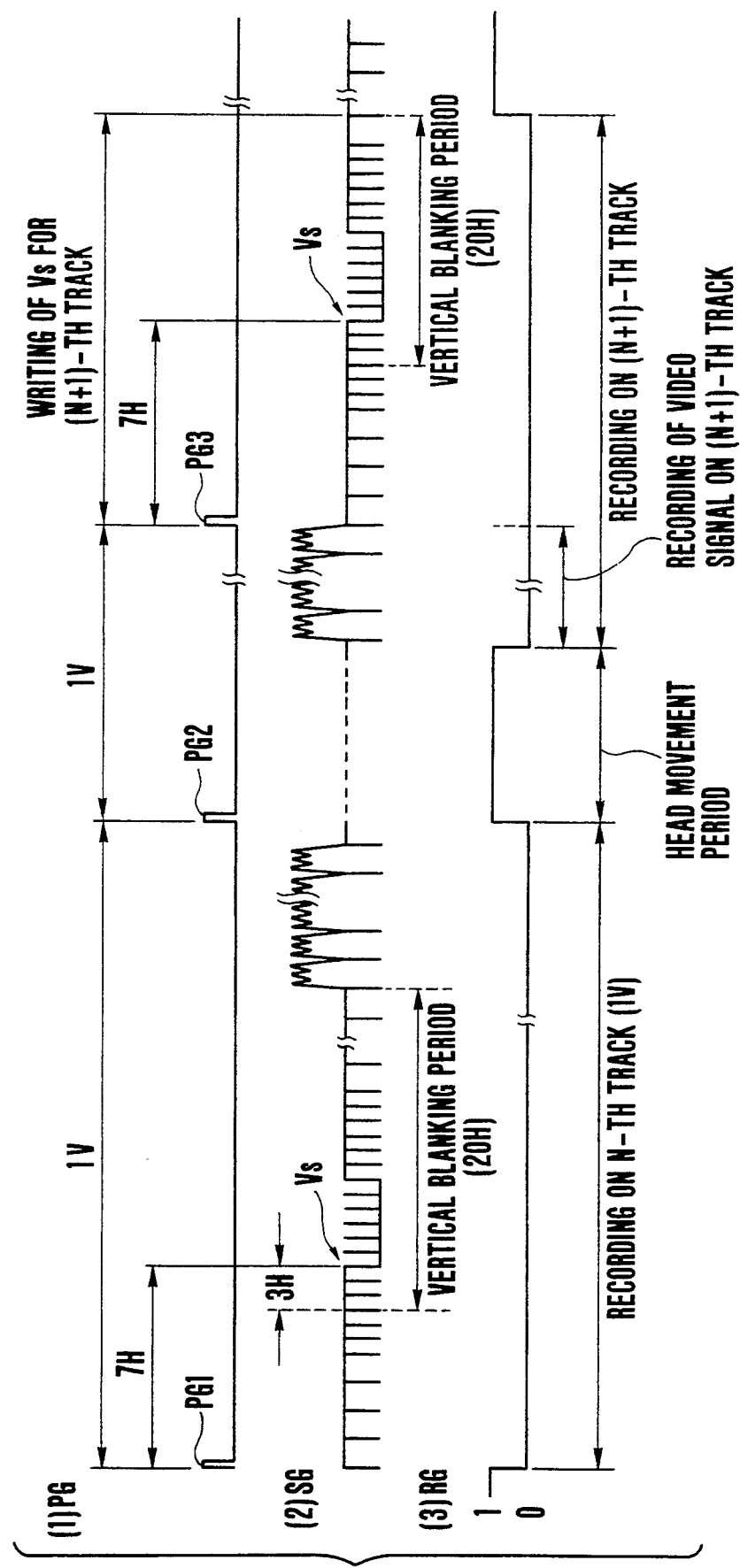
FIG. 6 is a timing chart of a recording operation of the first embodiment.

A recording sequence executed in an arrangement in which the illustrated first embodiment is incorporated in an electronic still camera will be described with reference to FIG. 6. Part (1) of FIG. 6 shows a PG signal, and one pulse is generated as the PG signal for each rotation of the floppy disc 18, i.e., at intervals of 1V (1V is one vertical synchronizing period). Part (2) of FIG. 6 shows a television signal SG. Part (3) of FIG. 6 shows a recording gate signal RG, and when it is at a "0" level, the television signal SG is recorded on the floppy disc 18. The following explanation is made in connection with a case where the television signal SG is recorded on the N-th track (N is an integer of 1 to 50). When the recording gate signal RG goes to its "0" level with respect to a PG pulse PG1, recording is started. When a 7H period passes after the pulse PG1, the leading edge of a vertical synchronizing signal Vs is recorded, and then a video signal from an image sensor (not shown) for one field is recorded to form the N-th track. Then, the field head 14 is immediately transferred to the (N+1)-th track. This transfer is completed within a vertical blanking period of 20H (approximately 1.2 ms). An operation for the (N+1)-th track is started with the recording of a video signal for the next field. The recording of the video signal is completed in synchronism with a PG pulse PG3, and, subsequently, the vertical blanking period is subjected to recording in such a manner that the leading edge of the vertical synchronizing signal Vs appears when a 7H period passes after the PG pulse PG3. In the above-described manner, the signals for a total of 1V period are recorded, whereby the (N+1)-th track is formed.

In the above-described manner, according to the first embodiment, one frame of image can be recorded during a continuous 2V period by the field head 14.

Although in the first embodiment an electromagnet is used as means for displacing the negative-pressure pad, another displacement means may be used which utilizes a piezoelectric element, a shape memory alloy or a motor as a drive source.

Since an opto-magnetic disc is a magnetic disc in a broad sense, the present invention is also applicable to an apparatus which rotationally drives the opto-magnetic disc as a recording medium.

As is readily understood from the foregoing description, according to the present invention, since the negative-pressure pad is pressed against a disc medium, it is possible to generate reliably a negative pressure between the disc medium and the negative-pressure pad without using an upper pad which generates a positive pressure pressing the recording medium to a head, whereby good head touch can be realized.

A recording or reproducing apparatus according to a second embodiment of the present invention will be described below with reference to FIGS. 7 to 10.

Figure 7:
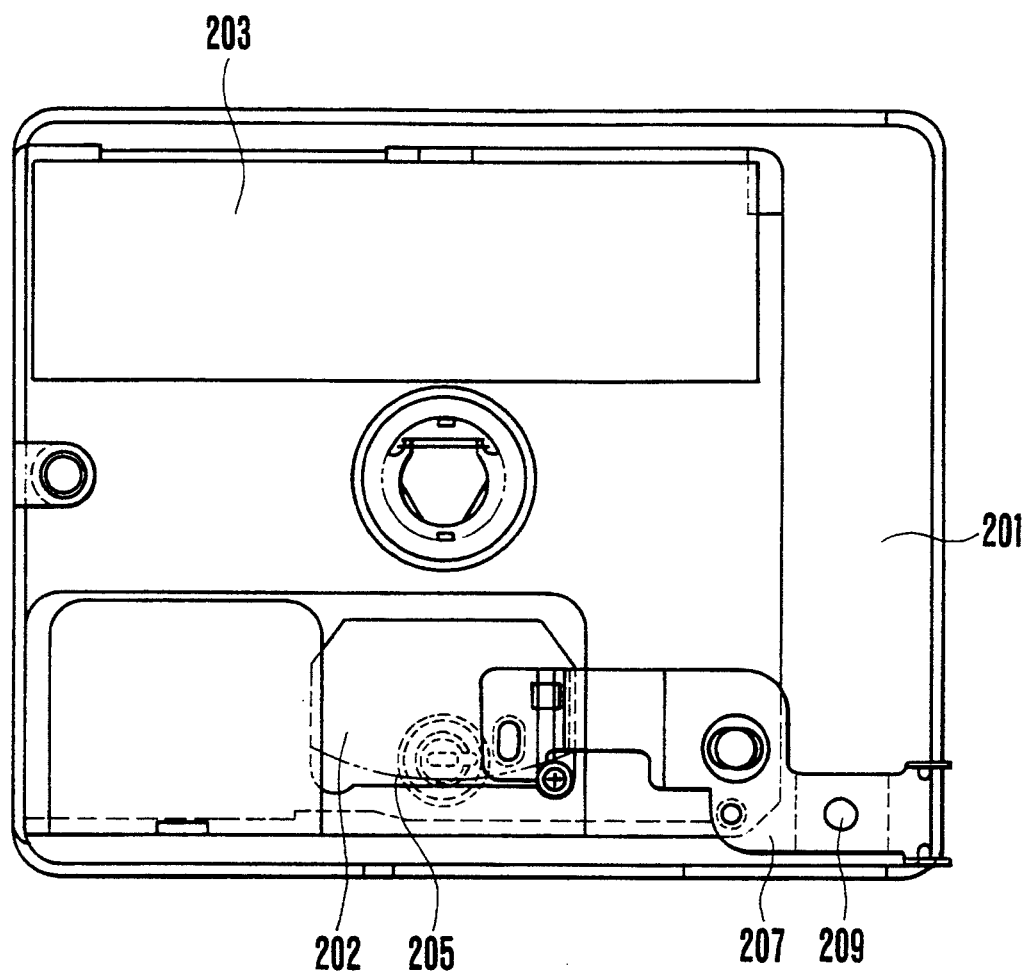
FIG. 7 is a diagrammatic plan view showing a recording or reproducing apparatus according to a second embodiment of the present invention.
Figure 8:
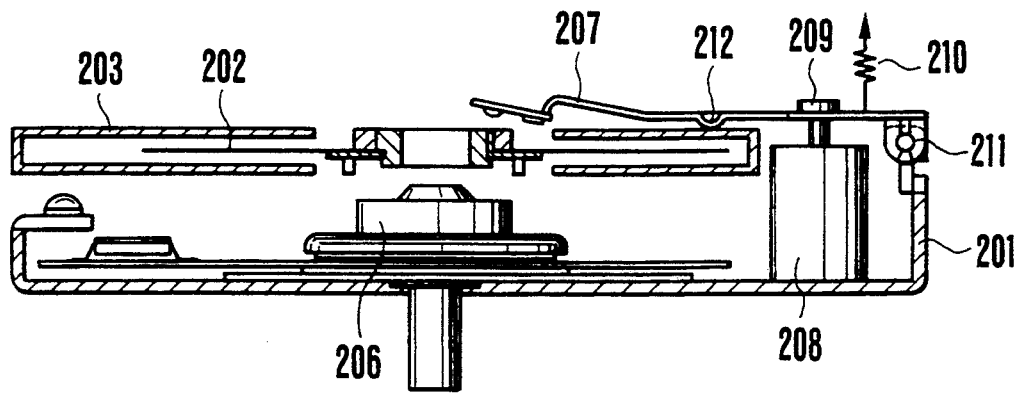
FIG. 8 is a diagrammatic cross-sectional view of the recording or reproducing apparatus of FIG. 7 with a magnetic disc placed in an unmounting position.
Figure 9A:
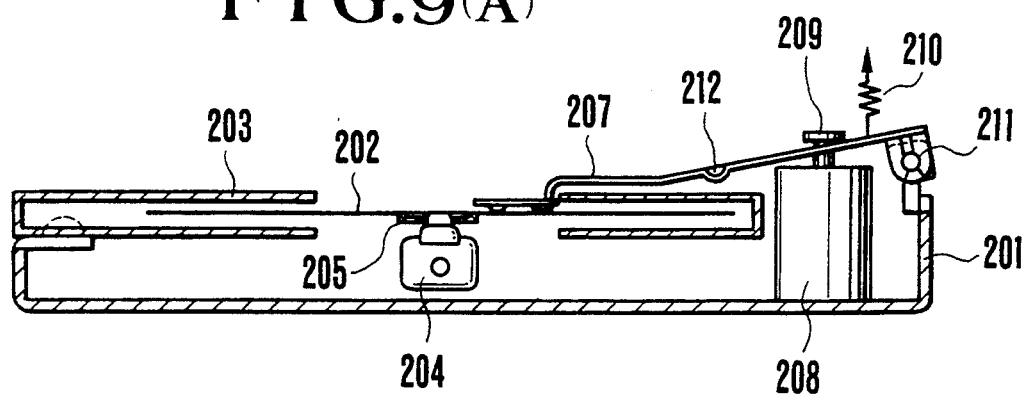
FIGS. 9(A) and 9(B) are diagrammatic cross-sectional views of the recording or reproducing apparatus of FIG. 7 with the magnetic disc placed in a mounting position.
Figure 9B:
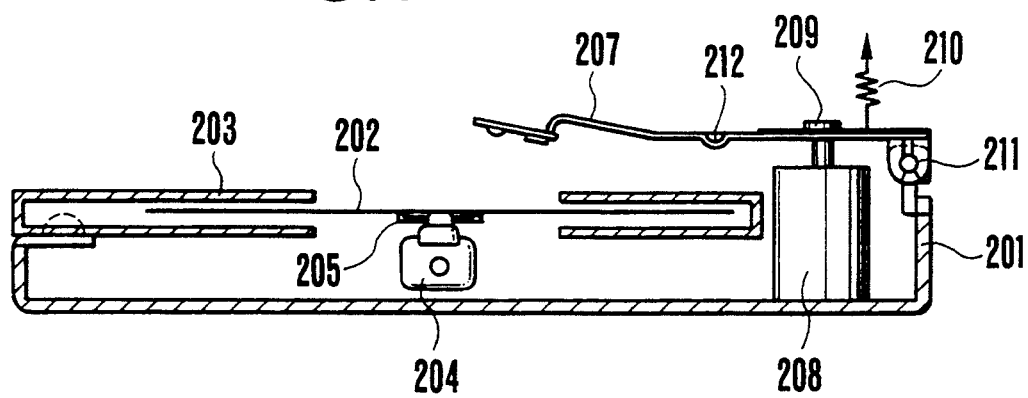
Figure 10:
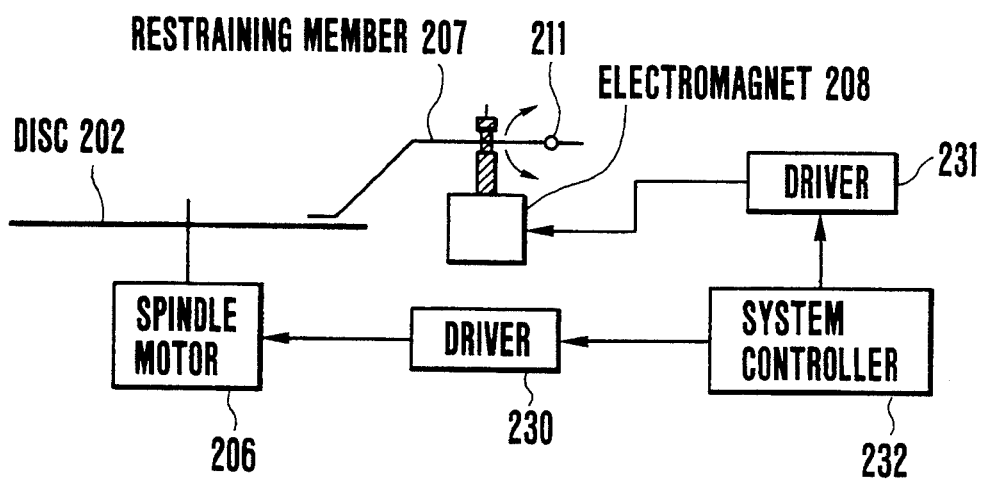
FIG. 10 is a block diagram showing the second embodiment.
Figure 11:
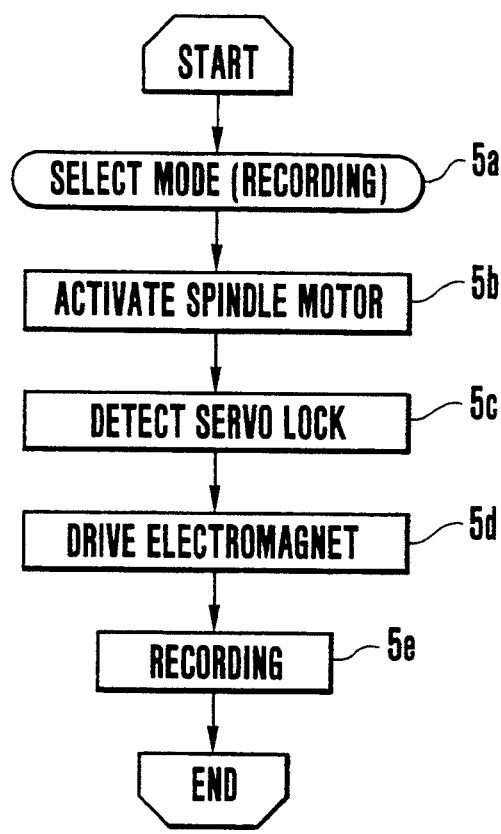
FIG. 11 is a flowchart showing the control of the disc drive device of FIG. 10.

FIG. 7 is a diagrammatic plan view showing the recording or reproducing apparatus according to the second embodiment of the present invention. FIG. 8 is a diagrammatic cross-sectional view of the recording or reproducing apparatus of FIG. 7 with the magnetic disc placed in an unmounting position. FIGS. 9(A) and 9(B) are diagrammatic cross-sectional views of the recording or reproducing apparatus of FIG. 7 with the magnetic disc placed in a mounting position. FIG. 10 is a block diagram showing the recording or reproducing apparatus according to the second embodiment. FIG. 11 is an explanatory flowchart of the operation of the second embodiment.

The recording or reproducing apparatus (or magnetic-disc drive device) according to the second embodiment shown in FIGS. 7 to 10 includes a chassis 201, a disc-shaped, flexible magnetic medium 202 on which information is to be recorded, a hard case 203 in which the magnetic medium 202 is accommodated, a head 204 for recording or reproducing information on or from the magnetic medium 202, and a pad 205. The pad 205 is fixed to the head 204 and has one surface provided with a groove. When the magnetic medium 202 is made to rotate, a negative pressure is generated by the groove to draw the magnetic medium 202 by suction. By this suction, the magnetic medium 202 and the head 204 are maintained in stable touch.

The recording or reproducing apparatus according to the second embodiment also includes a spindle motor 206 for rotationally driving the magnetic medium 202 at a predetermined rotational speed, and a restraining member 207 supported turnably at one end by a mounting portion 211 of the chassis 201. The restraining member 207 is provided with an engagement portion 212 which is brought into contact with the hard case 203 of the magnetic disc to hold the restraining member 207 in the state shown in FIG. 8 when the magnetic disc is in an unmounted state within the apparatus.

An electromagnet 208 is provided with a rod 209 which is engaged with the restraining member 207 at one end and which operates in interlocked relation to the drive of the electromagnet 208. An elastic member 210 urges the restraining member 207 in a direction away from the magnetic medium 202 (upward).

Referring to FIG. 10, the recording or reproducing apparatus further includes a rotation driving circuit 230 for rotationally driving the spindle motor 206, an electromagnet driving circuit 231 for driving the electromagnet 208, and a system controller 232 for controlling the rotation driving circuit 230 and the electromagnet driving circuit 231.

The operation of the recording or reproducing apparatus having the above-described arrangement will be described below with reference to the flowchart of FIG. 11.

The magnetic disc which has been inserted into the apparatus through a magnetic-disc insertion opening (not shown) is made to move from the unmounting position (refer to FIG. 8) to the mounting position (refer to FIGS. 9(A) and 9(B)) by a movement mechanism which is not shown.

Then, when a recording or reproducing mode is selected, the flow of FIG. 11 starts. The following description refers to a flow carried out when the recording mode is selected.

In Step 5a, the recording mode is selected. In Step 5b, the spindle motor 206 is rotationally driven by a command from the system controller 232. In Step 5c, detection of the predetermined rotational speed and rotational accuracy of the spindle motor 206 (so-called servo-lock detection) is performed by a detecting means (not shown), and when the spindle motor 206 reaches the predetermined rotational speed and rotational accuracy, the process proceeds to Step 5d. In Step 5d, the electromagnet 208 is driven during a predetermined time by a command from the system controller 232, thereby drawing the rod 209 into the electromagnet 208 by suction. The restraining member 207 which has been placed in a position away from the magnetic disc (the position of FIG. 9(B)) is made to move to a predetermined restraining position (the position of FIG. 9(A)) by the resultant urging force in interlocked relation to the drawing of the rod 209. Thus, the fluctuations of the rotation of the magnetic medium 202 are restrained to cause the pad 205 to draw securely the magnetic medium 202 by suction, thereby providing stable head touch between the head 204 and the magnetic medium 202. When the predetermined time passes, the energization of the electromagnet 208 is shut off and the restraining member 207 is made to move away from the magnetic medium 202 by the urging force of the elastic member 210. In Step 5e, information is recorded on the magnetic medium 202 by the head 204 and the flow is completed.

Although the above description pertains to the flow executed when the recording mode is selected, a similar operation is carried out when another mode is selected, such as a reproducing or erasure mode.

A third embodiment of the present invention will be described below with reference to FIGS. 12 and 13. In each of FIGS. 12 and 13, like reference numerals are used to denote like or corresponding elements which are similar to those shown in the aforementioned drawings.

Figure 12:
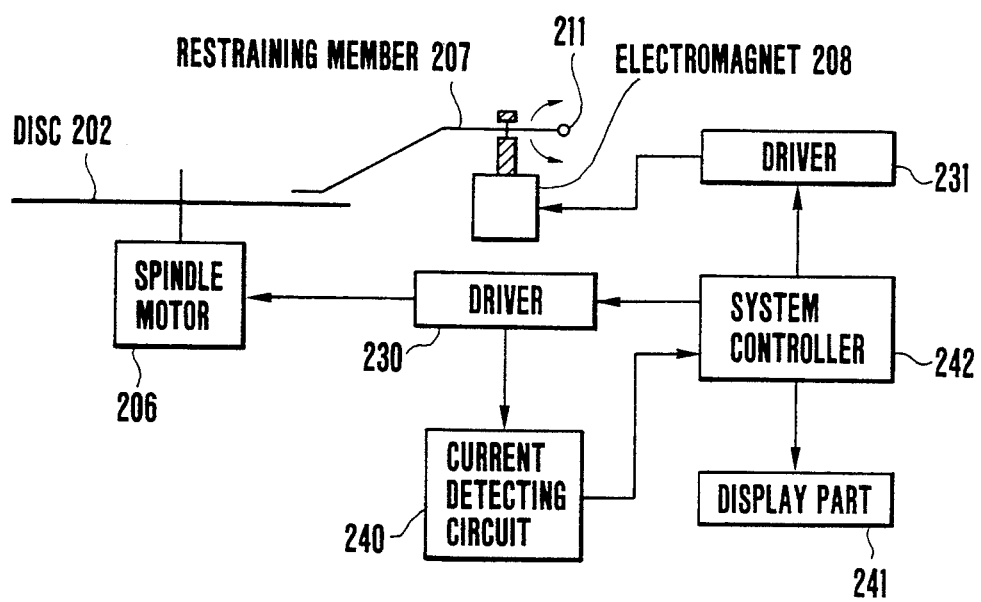
FIG. 12 is a block diagram showing a third embodiment.
Figure 13:
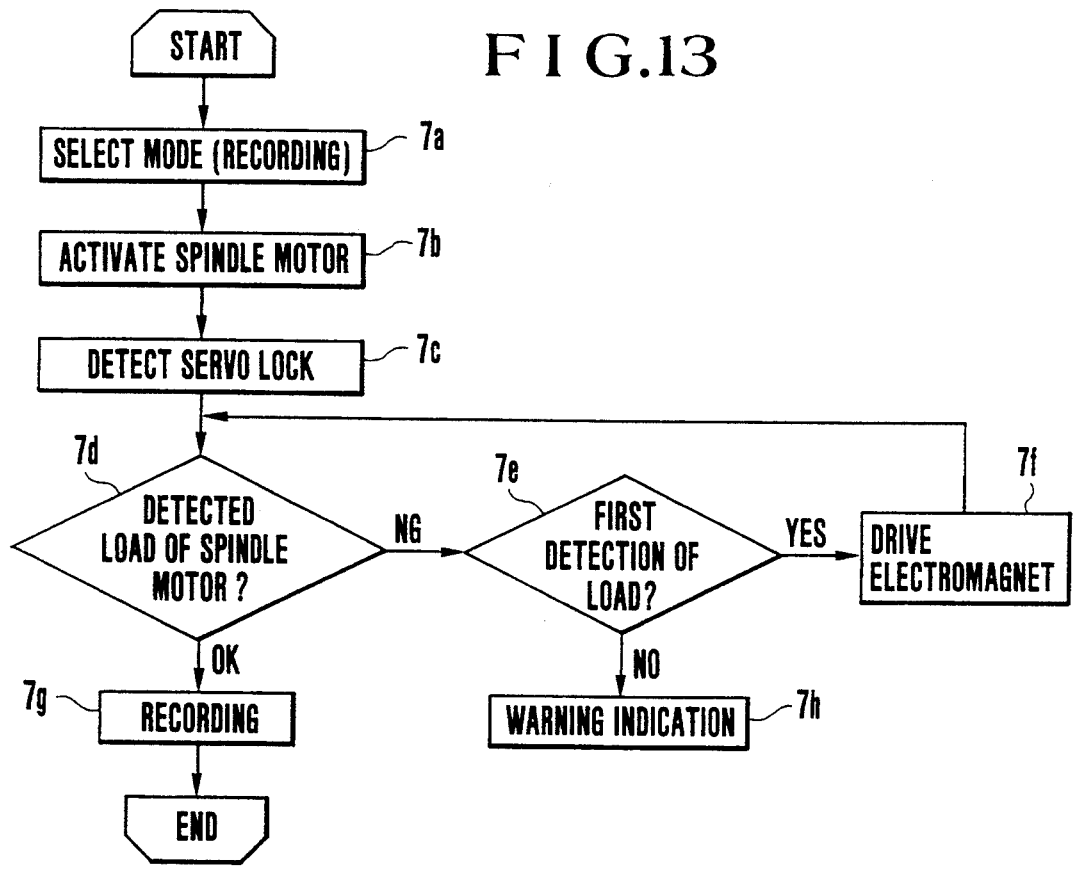
FIG. 13 is a flowchart showing the control of the disc drive device of FIG. 12.

FIG. 12 is a block diagram showing the third embodiment, and FIG. 13 is an explanatory flowchart of the operation of the embodiment of FIG. 12.

The recording or reproducing apparatus shown in FIG. 12 includes a current detecting circuit 240 for detecting the current of the rotation driving circuit 230, a display part 241, and a system controller 242 for controlling the rotation driving circuit 230, the current detecting circuit 240, the electromagnet driving circuit 231 and the display part 241.

The operation of the recording or reproducing apparatus having the above-described arrangement will be described below with reference to the flowchart of FIG. 13.

When the recording or reproducing mode is selected, the flow of FIG. 13 starts. The following description refers to a flow carried out when the recording mode is selected.

In Step 7a, the recording mode is selected. In Step 7b, the spindle motor 206 is rotationally driven by a command from the system controller 242. In Step 7c, servolock detection of the spindle motor 206 is performed by a detecting means (not shown), and when the spindle motor 206 reaches the predetermined rotational speed and rotational accuracy, the process proceeds to Step 7d. In Step 7d, the output of the current detecting circuit 240 is measured, and if this output is less than a predetermined value, the system controller 242 determines that the pad 205 has failed to draw the disc by suction. Then, the process proceeds to Step 7e. If the output is greater than or equal to the predetermined value, the process proceeds to Step 7g.

In Step 7e, it is determined whether the aforesaid output detection has been performed for the first time. In the case of the first time, the process proceeds to Step 7f; otherwise, the process proceeds to Step 7h.

If the process proceeds to Step 7h, the display part 241 displays a warning indication showing that the medium is in an abnormal state, in accordance with a command from the system controller 242, and the drive of the spindle motor 206 is stopped.

If the process proceeds to Step 7f on the basis of the decision made in Step 7e, electric power is supplied to the electromagnet driving circuit 231 for a predetermined time by the system controller 242, so that the electromagnet 208 is driven for a predetermined time to move the control member 207 to a predetermined restraining position. Thus, the pad 205 is made to draw securely the magnetic medium 202 by suction, whereby the head 204 and the magnetic medium 202 are held in stable head touch.

When the predetermined time passes, the energization of the electromagnet 208 is shut off and the restraining member 207 is made to move away from the magnetic medium 202 by the urging force of the elastic member 210. Then, the process returns to Step 7d.

In Step 7g, information is recorded on the magnetic medium 202 by the head 204, and the flow is brought to an end.

Although the above description pertains to the flow executed when the recording mode is selected, a similar operation is carried out when another mode is selected, such as the reproducing or erasure mode.

A fourth embodiment of the present invention will be described below with reference to FIGS. 14 and 15(A), 15(B). The fourth embodiment is realized by substituting a cam for the electromagnet which is used as a moving means for the restraining member in the third embodiment.

Figure 14:
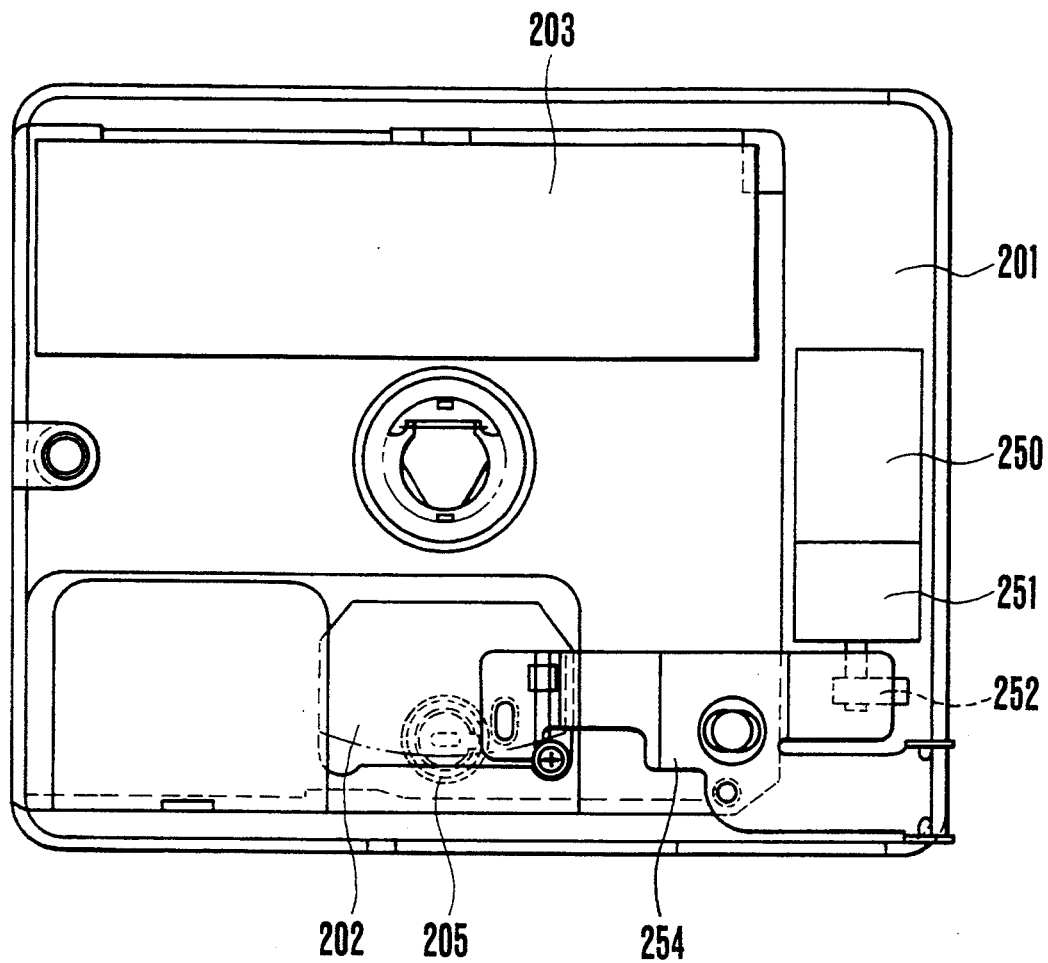
FIG. 14 is a plan view schematically showing a recording or reproducing apparatus according to a fourth embodiment.
Figure 15A:
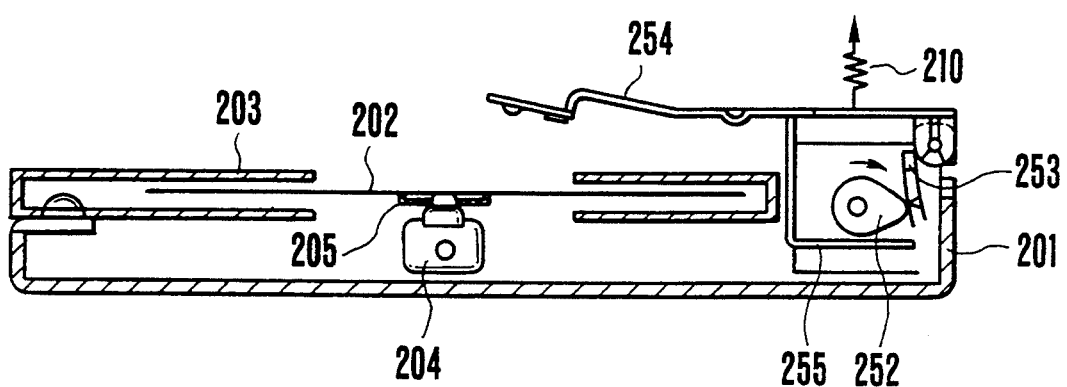
FIGS. 15(A) and 15(B) are cross-sectional views of the recording or reproducing apparatus of FIG. 14.
Figure 15B:
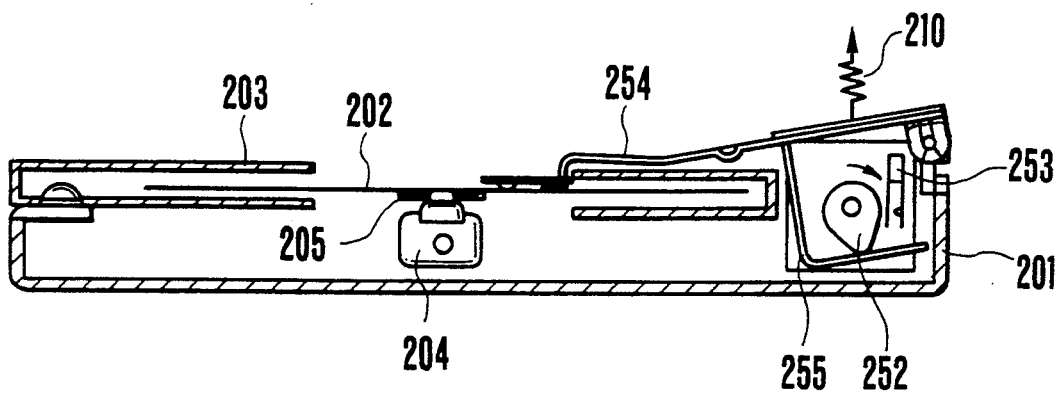

FIG. 14 is a plan view schematically showing a recording or reproducing apparatus according to the fourth embodiment of the present invention, and FIGS. 15(A) and 15(B) are cross-sectional views of the apparatus.

In each of FIGS. 14 and 15(A), 15(B), like reference numerals are used to denote like or corresponding elements which are similar to those shown in the aforementioned drawings, and a description thereof is omitted.

The recording or reproducing apparatus shown in FIGS. 14 and 15(A), 15(B) includes a motor 250, a speed reducer 251 for reducing the rotational speed of the motor 250, a cam 252 fixed to the output shaft of the speed reducer 251, as by press fitting or adhesion, a switch 253 for detecting the rotational phase of the cam 252, and a restraining member 254. The restraining member 254 is provided with a depressing portion 255 which comes into and out of contact with the cam 252 according to the turning angle of the cam 252.

A moving mechanism for the restraining member 254 operates as follows. When the cam 252 in the state of FIG. 15(A) is made to turn in the direction of the arrow shown in FIG. 15(A) by a command from the system controller, the cam 252 comes into contact with the depressing portion 255 and the restraining member 254 is depressed to its restraining position (the state of FIG. 15(B)) against the urging force of the elastic member 210 through the depressing portion 255. When the cam 252 is made to turn further, the restraining member 254 is made to move away from the magnetic medium 202 by the elastic member 210, and the cam 252 returns to its initial state (the state of FIG. 15(A)) and the switch 253 is turned on. When the switch 253 is turned on, the drive of the motor 250 is stopped and the turning of the cam 252 stops.

The operations of the other elements are substantially identical to those explained with reference to the flowchart of the third embodiment except for the above-described operation of the moving mechanism for the restraining member with which the fourth embodiment is provided.

A fifth embodiment of the present invention will be described below with reference to FIGS. 16(A) and 16(B). The fifth embodiment is realized by substituting a spring made of a shape memory alloy for the electromagnet which is used as moving means for the restraining member in the third embodiment.

Figure 16A:
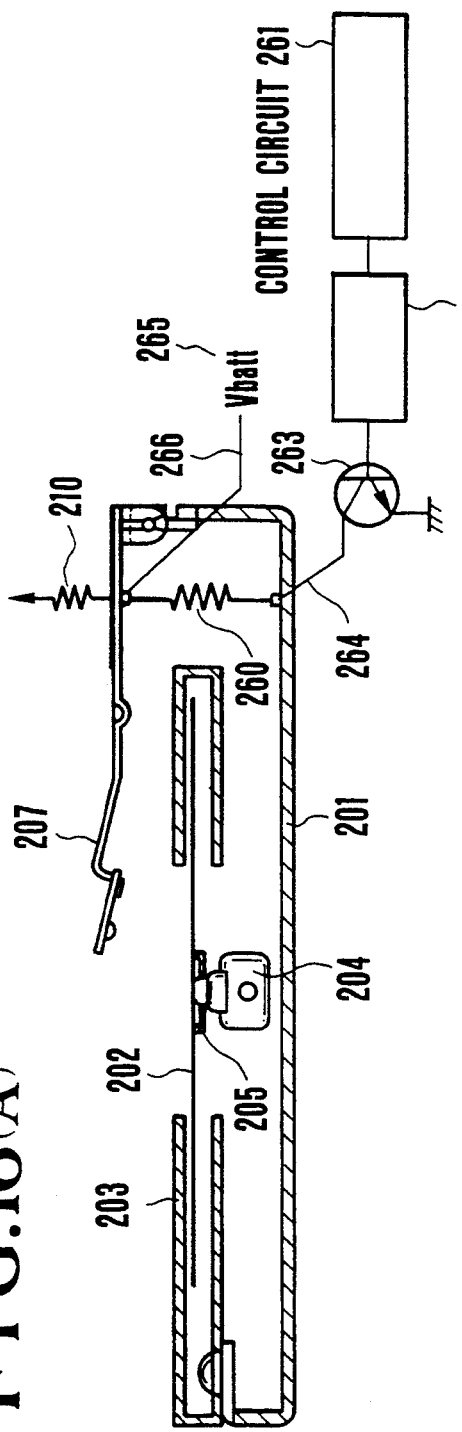
FIGS. 16(A) and 16(B) are cross-sectional views schematically showing a recording or reproducing apparatus according to a fifth embodiment.
Figure 16B:
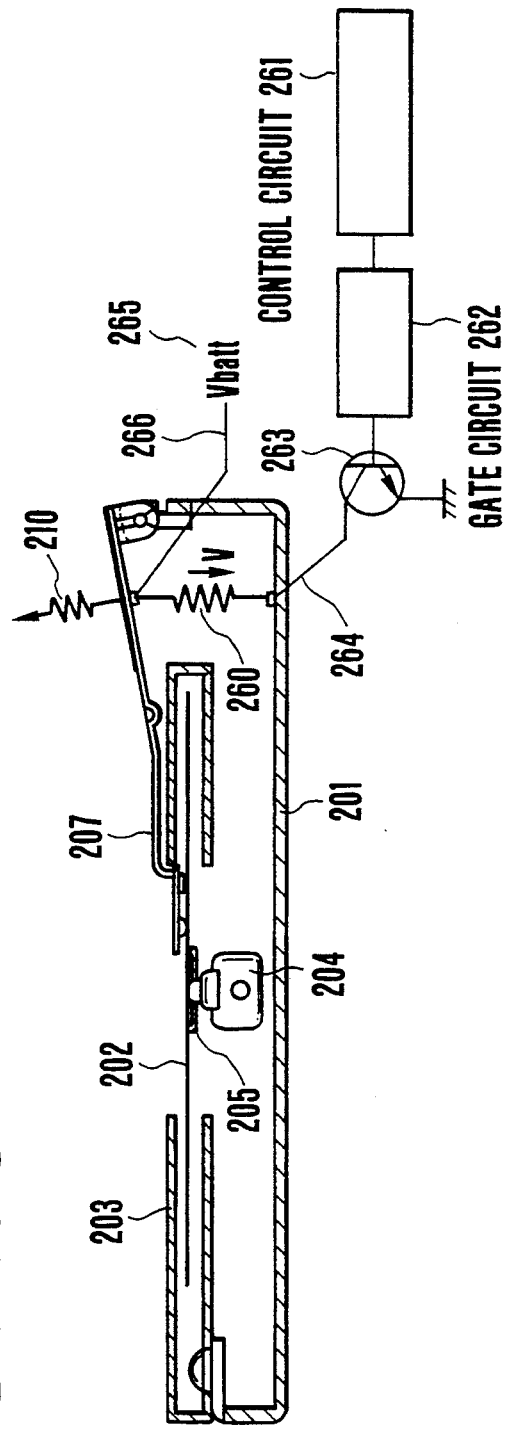

FIGS. 16(A) and 16(B) are cross-sectional views schematically showing a recording or reproducing apparatus according to the fifth embodiment of the present invention. In each of FIGS. 16(A) and 16(B), like reference numerals are used to denote like or corresponding elements which are similar to those shown in the aforementioned drawings, and a description thereof is omitted.

Referring to FIGS. 16(A) and 16(B), a spring 260 made of a shape memory alloy is fixed at one end to the restraining member 207 and at the other end to the chassis 201. The spring 260 shrinks by heat caused by the conduction of electricity therethrough.

A control circuit 261 is connected to one end of the spring 260 through a gate circuit 262, a transistor 263 and a lead wire 264, and functions as a switch for starting and stopping the supply of electricity to the spring 260. A power source 265 ($V_{batt}$) is connected to the other end of the spring 260 through a lead wire 266.

The operation of the above-described moving mechanism for the restraining member 207 is as follows. When a current is made to flow through the spring 260 for a predetermined time, the spring 260 generates heat and shrinks. The restraining member 207 is made to move to its restraining position (the state of FIG. 16(B)) against the urging force of the elastic member 210 in interlocked relation to the shrinkage of the spring 260. When the predetermined time passes, the current supplied to the spring 260 is cut off and the elastic force of the spring 260 weakens. Accordingly, the restraining member 207 is made to move away from the magnetic medium 202 by the urging force of the elastic member 210 (the state of FIG. 16(A)).

The operations of the other elements are substantially identical to those explained with reference to the flowchart of the third embodiment except for the above-described operation of the moving mechanism for the restraining member with which the fifth embodiment is provided.

As is apparent from the foregoing description, according to each of the embodiments of the present invention, since the restraining means for restraining the fluctuations of the rotation of a magnetic medium is made to move away therefrom after the magnetic medium has been securely drawn to the pad by suction, the magnetic medium is prevented from coming into contact with the restraining means due to the fluctuations of the rotation of the magnetic medium itself. Accordingly, it is possible to prevent occurrence of the irregular rotation of a rotating system and damage to the magnetic medium both of which would have been experienced with the conventional apparatus, whereby the durability of the magnetic medium can be improved.

What is claimed is:

1. A disc drive device comprising:
    a negative-pressure pad for generating a negative pressure between said negative-pressure pad and a disc-shaped recording medium by the rotation of the disc-shaped recording g medium; and
    displacement means for bringing said negative pressure pad and a surface of the disc-shaped recording medium close to each other at least once after the disc-shaped recording medium has started to rotate, said displacement means being away from said negative pressure pad and said surface of the disc-shaped recording medium after said bringing operation.

2. A disc drive device according to claim 1, wherein a recording head is disposed in the middle of said negative-pressure pad.

3. A disc drive device according to claim 2, wherein said negative-pressure pad and the recording head are secured to a head carriage which is disposed for movement radially of the disc-shaped recording medium, the head carriage being movable so that the recording head is moved into and out of contact with a recording surface of the disc-shaped recording medium.

4. A disc drive device according to claim 1, wherein said displacement means having a member movable by an electromagnet.

5. A disc drive device according to claim 4, wherein said displacement means causing to move the pad by the moving of said member.

6. A disc drive device according to claim 1, wherein said displacement means having a member rotatable on a chassis.

7. A disc drive device according to claim 6, wherein said member pressing the medium toward the pad.

8. A disc drive device according to claim 6 or claim 7, further comprising an electromagnet causing said member to rotate.

9. A disc drive device according to claim 6 or claim 7, further comprising a cam causing said member to rotate.

10. A disc drive device according to claim 6 or claim 7, further comprising a spring made of a shape memory alloy.

11. A recording or reproducing apparatus comprising:
    a head for performing conversion of information when in contact with a flexible medium;
    a rotating mechanism for causing the medium to rotate at a predetermined rotational speed;
    a pad for drawing the medium to said head by suction while the medium is rotating; and
    controlling means movable between a first position for restraining the rotational fluctuations of the medium and a second position away from the medium, depending on the state of suction between the medium and said pad, said controlling means not restraining the rotational fluctuations of the medium at the second position.

12. A recording or reproducing apparatus according to claim 11, wherein said control means having a member rotatable on a chassis.

13. A recording or reproducing apparatus according to claim 12, wherein said member pressing the medium toward the pad.

14. A recording or reproducing apparatus according to claim 12 or 13, further comprising an electromagnet causing said member to rotate.

15. A recording or reproducing apparatus according to claim 12 or 13, further comprising a cam causing said member to rotate.

16. A recording or reproducing apparatus according to claim 12 or 13, further comprising a spring made of a shape memory alloy.

17. A recording or reproducing apparatus comprising:
    a head for performing conversion of information when in contact with a flexible medium;
    a rotating mechanism for causing the medium to rotate at a predetermined rotational speed;
    a pad for drawing the medium to said head by suction while the medium is rotating; and
    restraining means movable from a first position close to the medium to a second position away from the medium after restraining the rotational fluctuations of the medium for a predetermined time in the first position.

18. A recording or reproducing apparatus according to claim 14, wherein said restraining means having a member rotatable on a chassis.

19. A recording or reproducing apparatus according to claim 18, wherein said member pressing the medium toward the pad.

20. A recording or reproducing apparatus according to claim 18 or 19, further comprising an electromagnet causing said member to rotate.

21. A recording or reproducing apparatus according to claim 18 or 19, further comprising a cam causing said member to rotate.

22. A recording or reproducing apparatus according to claim 18 or 19, further comprising a spring made of a shape memory alloy.

23. A recording or reproducing apparatus comprising:
- a head for performing conversion of information when in contact with a flexible medium;
- a rotating mechanism for causing the medium to rotate at a predetermined rotational speed;
- a pad for stabilizing a state of contact between said head and the medium; and
- a restricting member movable between a first position away from the medium and a second position for restricting the medium in a state close to said pad during the rotation of the medium, said restricting member not restricting the medium at the first position.

24. A recording or reproducing apparatus according to claim 23, wherein said restricting member having a member rotatable on a chassis.

25. A recording or reproducing apparatus according to claim 24, wherein said member pressing the medium toward the pad.

26. A recording or reproducing apparatus according to claim 24 or 25, further comprising an electromagnet causing said member to rotate.

27. A recording or reproducing apparatus according to claim 24 or 25, further comprising a cam causing said member to rotate.

28. A recording or reproducing apparatus according to claim 24 or 25, further comprising a spring made of a shape memory alloy.

* * * * *

UNITED STATES PATENT AND TRADEMARK OFFICE
CERTIFICATE OF CORRECTION

PATENT NO. : 5,359,590

DATED : October 25, 1994

INVENTOR(S) : Shigeo Ogura et al.

It is certified that error appears in the above-identified patent and that said Letters Patent is hereby corrected as shown below:

Col. 13, line 2. Change "14" to —17—.

Signed and Sealed this

Thirty-first Day of January, 1995

Attest:

BRUCE LEHMAN

Attesting Officer     Commissioner of Patents and Trademarks